United States Patent Office 3,360,539
Patented Dec. 26, 1967

3,360,539
CHLORINATION OF AROMATIC ISOCYANATES
Joseph P. Henry, South Charleston, W. Va., assignor to Union Carbide Corporation, a corporation of New York
No Drawing. Filed Apr. 12, 1963, Ser. No. 272,554
6 Claims. (Cl. 260—453)

This invention relates to the chlorination of various organic isocyanates, and more significantly, to the chlorination of aromatic isocyanates where the aromatic moiety possesses at least one ring-carbon hydrogen atom. More specifically, this invention is directed to the chlorination of aromatic polyisocyanates having at least one hydrogen bonded to a carbon atom of the aromatic ring.

Heretofore, chlorination of aromatic isocyanates has been effected at relatively elevated temperatures though in some instances it has been found possible to effect chlorination of polyisocyanates, particularly toluene diisocyanates in solvent solutions, at temperatures of 10° C. up to 80° C. However, this is normally effected in the presence of a halogen carrier (or catalyst) such as ferric halide or iodine and, more often, when a temperature between 10° C. and 30° C. is employed.

Such techniques for chlorinating isocyanates create various undesirable problems in catalyst removal from the chlorination products and undesired side chain chlorination, such as formation of chloromethyl substituted products. These chloromethyl substituted products tend to be readily hydrolyzed tending to make them undesirable for many uses.

It is herein provided a method for the chlorination of organic isocyanates which involves no catalyst removal problems and is effected at exceedingly low temperatures, thereby significantly minimizing side reactions.

The process of this invention is achieved by the addition of anhydrous hydrogen chloride and chlorine to the isocyanate to be chlorinated. The HCl may be added prior to or simultaneously with the addition of chlorine. The process is effected at a temperature of from about —20° C. to 20° C., preferably from about —10° C. to 10° C. An important feature in the operation of this process is to effect chlorination in the dark.

The present reaction is exothermic and hence it is usually necessary during chlorination to minimize excessive temperature rise, i.e., above the temperatures recited above. Control over temperature can be effected in a variety of ways, such as by conventional indirect (such as in an ice bath) and direct cooling (such as with cold solvent) techniques, control over reactant (particularly Cl₂) addition, and the like.

The isocyanates chlorinatable in the process of this invention include aromatic compounds which possess at least one, preferably at least two, isocyanato groups bonded to a ring carbon atom. The compound may possess 1, 2, 3, etc. aromatic ring nuclei and must contain at least one hydrogen atom bonded to at least one ring carbon atom. Illustrative of isocyanates which may be chlorinated in accordance with this invention include phenyl isocyanate, tolyl isocyanate, toluene diisocyanate, such as 2,4-toluene diisocyanate, 2,6-toluene diisocyanate and mixtures thereof, 4,4'-methylenedi-ortho-tolylisocyanate, 2,4, 4'-triisocyanatodiphenylether, toluene-2,4,6-triisocyanate, 1-methoxy-2,4,6 - benzenetriisocyanate, meta-phenylene-diisocyanate, 4,4'-biphenyldiisocyanate, 1,5-naphthalene-diisocyanate, diphenylmethane p:p'-diisocyanate, bis(4-isocyanatocyclohexyl)-methane, stilbene diisocyanate, dixylylmethane diisocyanates, 2,2 - bis(4-isocyanatophenyl) propane, 2,2,1-tris(4-isocyanatophenyl)propane, diphenylmethane tetraisocyanates, trimethylbenzene, triisocyanates, phenyltolylmethane triisocyanates, ditolylmethane triisocyanates, triphenylmethane triisocyanates, 3,3' - dimethyldiphenylene-4,4'-diisocyanate, 3,3' - dimethoxydiphenylene-4,4'-diisocyanate, diphenyl triisocyanates, and diphenylcyclohexane-p:p'-diisocyanate.

The process is desirably effected by addition hydrogen chloride and chlorine to the polyisocyanate dissolved in a solvent. The solvent should be a material which is not readily chlorinatable at the temperatures employed. Illustrative of usable solvents include the chlorinated hydrocarbons such as, carbon tetrachloride, 1,2-ethylene dichloride, perchloroethane, chloroform, tetrachloropropane, perchloroethylene, methylchloroform, and the like.

The process of this invention is more favorably conducted in the total absence of light. This serves to prevent splitting of chlorine from the chlorinated polyisocyanate product and enhance the color of the product. Moreover, darkness reduces the tendency of side chain chlorination. The process is also favorably conducted in the absence of oxygen. Thus, the reaction is preferably conducted in an atmosphere of inert gas. The usable gases include nitrogen, argon, carbon dioxide, helium and the like.

The amount of anhydrous hydrogen chloride employed should be sufficient to theoretically convert at least a portion of the isocyanate moieties to carbamoyl chloride. Thus, a molar amount of HCl up to the molar amount of isocyanate compound may be employed. There may be employed greater quantities of HCl than is necessary to convert one isocyanato moiety carbamoyl chloride, but such is not usually necessary. In most instances it is desirable to utilize an amount of HCl which is less than equimolar to isocyanate compound, such as amounts of from 0.001 to 80 mol percent of HCl basis molar quantity of isocyanate compound present in the reaction mixture.

Simultaneously with or after addition of the anhydrous hydrogen chloride to the polyisocyanato compounds under reaction, anhydrous chlorine should be added to the reaction mixture. Preferably, anhydrous hydrogen chloride is added prior to chlorine addition. The reaction between the anhydrous chlorine and the polyisocyanato compounds is usually exothermic and hence, the exothermic reaction is regarded indicative of chlorination. It is important to maintain the reaction mixture at the aforementioned temperature ranges. As indicated previously, control of the reaction mixture temperature during chlorination is often necessary.

The amount of chlorine introduced to the reaction mixture should be at least sufficient to effect monochlorination of at least a part of the isocyanato compounds under reaction. If desired, additional quantities may be introduced to effect polychlorination of the total isocyanato compounds undergoing reaction. Preferably, there should be added to the reaction at least ½ mol of chlorine per mol of isocyanate compound in the reaction mixture, and more preferably, at least one mol of chlorine per mol of isocyanate compound.

As a result of the process of this invention it is possible to produce mono-, di-, tri-, tetra-, etc., chloro derivatives of the aromatic isocyanate compound undergoing chlorination. The only limit to the degree of chlorination which may be effected with a particular compound is the number of aromatic carbon bonded hydrogen possessed by the compound. Thus chlorination may be effected to a maximum substitution of the aromatic ring bonded hydrogens of the compound.

The reaction mixture resulting from chlorination is readily purified of unreacted chlorine by passing a gaseous olefin through the reaction mixture, thereby to form a chlorinated olefin product which is readily isolatable by conventional separation techniques, e.g., distillation, decantation, crystallization and the like. Thus, ethylene, propylene, etc., may be fed to the reaction mixture to react with unreacted chlorine to thereby remove from the reaction the corresponding halogenated hydrocarbon. Chlorine removal from the reaction mixture may also be effected by passing an inert gas, such as described above, through the reaction mixture. Hydrogen chloride is desirably recovered after chlorine removal by simply heating the reaction mixture to vaporize hydrogen chloride therefrom. Other methods of isolating the chlorinated polyisocyanate product are readily within the purview of those skilled in this art.

In order to more specifically illustrate the operation of the invention herein described, recourse is made to the following examples which are not considered to limit the scope of the process herein described.

*Example I*

In a 2-liter round-bottom flask equipped with a brine-cooled dropping funnel, stirrer, thermometer and outlet tube was charged 870 grams of carbon tetrachloride and 181 grams (1.04 mols) of a mixture of toluene diisocyanate (about 80 percent 2,4-toluene diisocyanate and about 20 percent 2,6-toluene diisocyanate, basis weight of mixture). All of the glass equipment was either painted black or covered with black tape to exclude light from the reaction mixture. The flask was purged with dry nitrogen and the temperature of the solution was reduced to 0° C. by ice cooling while stirring the ingredients in the flask. 170 grams (2.5 mols) or anhydrous chlorine dissolved in 1,000 grams of carbon tetrachloride were slowly fed through the brine-jacketed dropping funnel to the flask. After 15 milliliters of this mixture had been added, the characteristic signs of the chlorination reaction (e.g., evolution of heat and suckback of the water scrubber on the exit line) were missing. There was no apparent reaction.

5 grams of anhydrous hydrogen chloride gas (0.14 mol) was bubbled into the reaction mixture and addition of the chloride solution was resumed. The exothermic reaction started immediately so that, even with wet-ice cooling applied, the temperature rose to +3° C. within 15 minutes and remained at that level, or slightly above, for the duration of the run.

The rate of feed was adjusted to maintain the temperature of the mixture generally between 0° C., and 6° C. The addition was complete in 1.5 hours and stirring was continued for an additional 3.5 hours. Nitrogen was then purged through the mixture and ethylene was added to remove unreacted chlorine. Carbon tetrachloride and ethylene dichloride were removed by distillation and the residue was vacuum distilled to isolate the chlorinated toluene-diisocyanate.

The product distilling between 129° C. and 138° C. at 7 millimeters mercury pressure was a solid at room temperature. Diisocyanate analysis of several of these distillation cuts indicated a molecular weight of 204 and 208. The molecular weight of mono-chloro-toluene diisocyanate is 208.5. It was indicated from analysis that the chlorinated product was an isomeric mixture of mono-chloro-2,4-toluene diisocyanate and monochloro-2,6-toluene diisocyanate.

*Example II*

In a 2-liter round-bottom flask, painted with black paint and equipped as described in Example I, was placed 208 grams (1.0 mol) of monochlorotoluene diisocyanate (prepared as detailed in Example I) dissolved in 1870 grams of carbon tetrachloride. All light was excluded from the equipment, and the system was purged with dry nitrogen as the isocyanate solution was cooled to 0° C.

Approximately 5 grams of anhydrous gaseous chlorine was introduced under the surface of the stirred solution; no indication of any absorption or reaction of chlorine was observed during a fifteen-minute period.

Anhydrous hydrogen chloride, 5 grams, was then introduced into the mixture over a period of 15 minutes, after which gaseous chlorine was bubbled into the reaction mixture and an immediate temperature rise was noted. A total of 107 grams (1.5 mols) chlorine was added over a period of 4 hours. The rate of chlorine addition, together with external cooling, allowed the temperature of the reaction mixture to be maintained at 0–4° C. The reaction mixture was allowed to stand overnight in an ice water bath; after purging with dry nitrogen, ethylene gas was introduced into the reaction mixture over a period of one hour to react with any dissolved chlorine.

The crude reaction mixture was stripped to a kettle temperature of 150° C., and a vapor temperature of 78° C. at atmospheric pressure to remove carbon tetrachloride and ethylene dichloride. The residue from the stripping was fractionally distilled under reduced pressure, and the desired polychlorotoluene diisocyanate, boiling at 138–150° C. at 7 mm. of mercury absolute pressure, amounted to 26 grams.

Though the above is specific with respect to details of this invention, it is not intended that these details should act as limits to the invention herein described except insofar as they are found in the claims.

What is claimed is:

1. In the process of chlorinating aromatic isocyanates selected from the group consisting of phenyl isocyanate, tolyl isocyanate, toluene diisocyanates, 4,4'-methylenediortho-tolylisocyanate, 2,4,4' - triisocyanatodiphenylether, toluene-2,4,6-triisocyanate, 1-methoxy - 2,4,6 - benzenetriisocyanate, meta-phenylenediisocyanate, 4,4'-biphenyldiisocyanate, 1,5 - naphthalenediisocyanate, diphenylmethane-p:p'-diisocyanate, stilbene diisocyanates, dixylylmethane diisocyanates, 2,2-bis-(4-isocyanatophenyl)propane, 2,2,1-tris(4-isocyanatophenyl)propane, diphenylmethane tetraisocyanates, trimethylbenzene triisocyanates, phenyltolylmethane triisocyanates, ditolylmethane triisocyanates, triphenylmethane triisocyanates, 3,3'-dimethyldiphenylene-4,4'-diisocyanate, 3,3'-dimethoxydiphenylene-4,4'-diisocyanate, diphenyl triisocyanates, and diphenylcyclohexane-p:p'-diisocyanate, the improvement which comprises contacting a quantity of said aromatic isocyanate maintained in the dark at a temperature of between —20° C. and 20° C. with a feed of chlorine and an added feed of anhydrous hydrogen chloride as the sole catalyst in sufficient amounts to initiate chlorination of said aromatic isocyanate.

2. The process of claim 1 wherein the aromatic isocyanate is toluene diisocyanate dissolved in a chlorinated hydrocarbon solvent.

3. The process of claim 2 wherein the solution of toluene diisocyanate in the solvent is maintained at —10° C. to 10° C. and after chlorination of the toluene diisocyanate residual chlorine and hydrogen chloride are removed from the solution.

4. The process of claim 3 wherein residual chlorine is removed by feeding to the solution a gas from the group consisting of an inert gas and an olefin.

5. The process of claim 1 wherein the hydrogen chloride is fed in amounts of from 0.001 to 80 mole percent of the molar quantity of the aromatic isocyanate.

6. The process of claim 1 wherein chlorine is fed in an amount of at least ½ mole per mole of the isocyanate.

References Cited

UNITED STATES PATENTS

| | | | |
|---|---|---|---|
| 1,219,166 | 3/1917 | Schmidlin et al. | 260—694 X |
| 2,280,290 | 4/1942 | High | 260—694 X |
| 2,786,864 | 3/1957 | Wirth et al. | 260—453 |
| 2,915,545 | 12/1959 | Tazuma | 260—453 |
| 2,137,783 | 11/1938 | Prutton et al. | 260—694 X |
| 2,675,409 | 4/1954 | Orloff et al. | 260—694 X |

FOREIGN PATENTS 835,592   5/1960   Great Britain.

CHARLES B. PARKER, *Primary Examiner.*

JOSEPH P. BRUST, *Examiner.*

D. R. MAHANAND, D. H. TORRENCE,
*Assistant Examiners.*